Figure 1:
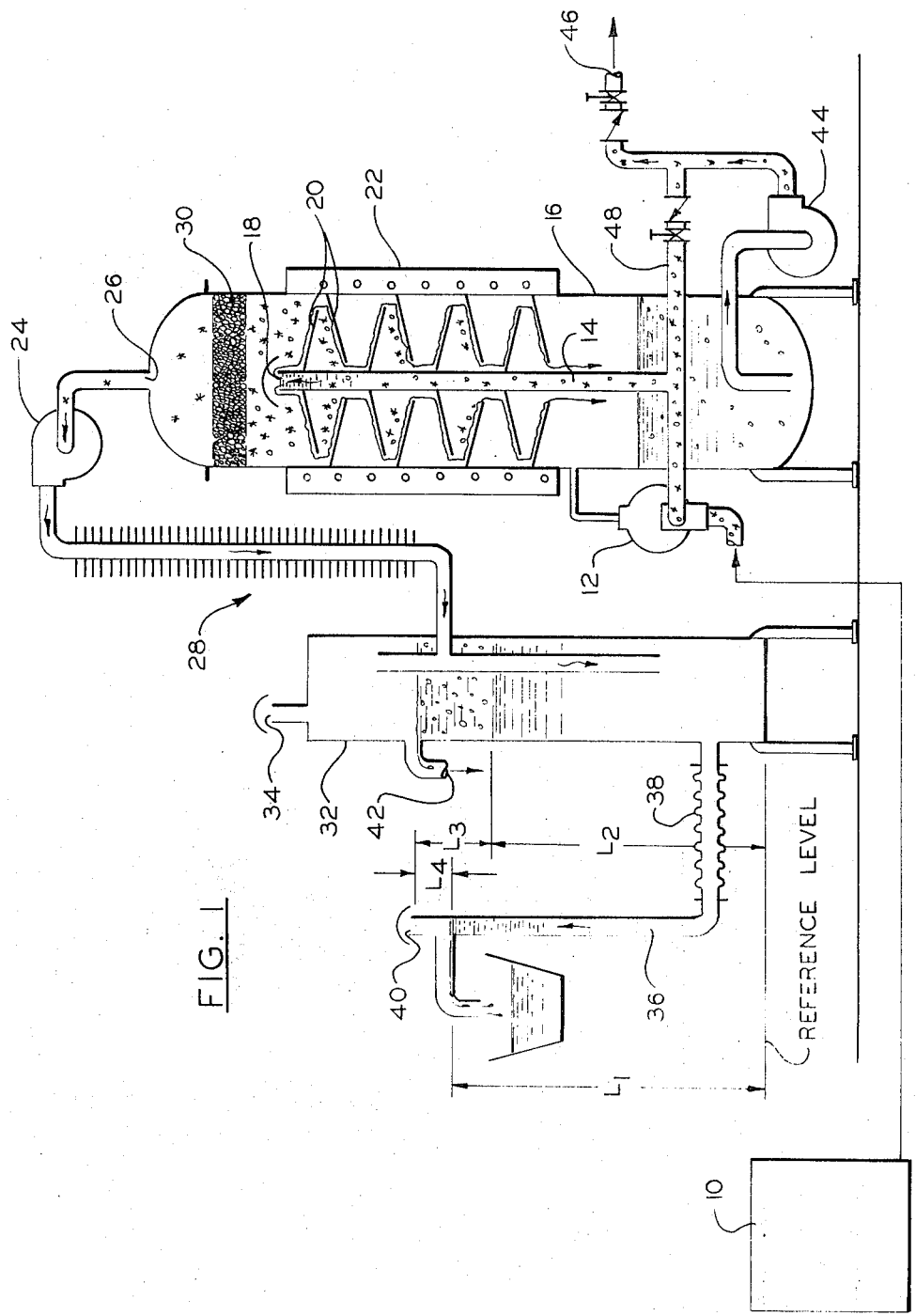

United States Patent [19]
El-Hindi

[11] 3,789,579
[45] Feb. 5, 1974

[54] REMOVAL OF AIR AND WATER FROM OIL
[75] Inventor: Ahmad M. El-Hindi, Fabius, N.Y.
[73] Assignee: Filter Tech, Inc., Manlius, N.Y.
[22] Filed: Jan. 10, 1972
[21] Appl. No.: 216,422

[52] U.S. Cl............................ 55/50, 55/55, 55/193
[51] Int. Cl........................................... B01d 19/00
[58] Field of Search... 55/46, 50, 55, 165, 178, 193; 210/114, 115

[56] References Cited
UNITED STATES PATENTS

| | | | |
|---|---|---|---|
| 2,812,827 | 11/1957 | Worley et al. | 210/114 X |
| 2,379,215 | 6/1945 | Brinkmann | 55/50 X |
| 3,517,487 | 6/1970 | Burnham, Sr. | 55/165 |
| R20,227 | 1/1937 | Gordon | 210/115 X |

FOREIGN PATENTS OR APPLICATIONS

| | | | |
|---|---|---|---|
| 905,183 | 9/1962 | Great Britain | 55/193 |
| 392,044 | 5/1933 | Great Britain | 55/193 |

Primary Examiner—Samih N. Zaharna
Assistant Examiner—Richard W. Burks

[57] ABSTRACT

A method and system for removing air and/or water vapor from a lubricating oil after use in a process such as aluminum wire drawing. The contaminated oil is discharged within a container at less than atmospheric pressure, caused to flow in a thin layer over an elongated path, and the escaping air and vapors removed through the top of the container, preferably after passing through a coalescing element. The vapors are condensed and any oil fractions which may have been removed with the water vapor is separated by automatic gravity flow.

8 Claims, 2 Drawing Figures

REMOVAL OF AIR AND WATER FROM OIL

The present invention relates to removal of contaminants such as air and/or water from a liquid and, more particularly, to systems and methods of removing air bubbles and water droplets from lubricating oil at relatively low temperatures.

In certain manufacturing operations viscous oils are used to lubricate contact surfaces and to act as a coolant. For example, in the manufacture of aluminum wire by drawing the wire through dies or passing it through rollers to reduce the diameter, the surfaces of the product and the dies or rollers are lubricated and heat removed by lubricating oils. During normal industrial operations of this type, water or air may become entrapped in the oil due to condensation, leakage, aeration at the suction of pumps, etc. The water or air will be in the form of finely dispersed droplets or bubbles.

It is extremely important that any entrapped air or water be removed from the oil since a contamination of as little as 0.2 percent of water or air may render the oil ineffective. Furthermore, the contaminants must be removed at a temperature below the normal boiling point of water, for example about 160° F. or less, since higher temperatures may destroy some of the additives in the oil.

It is a principal object of the present invention to provide novel methods and systems for removing air and/or water from liquids such as lubricating oils at relatively low temperatures, particularly as such oils are used in an aluminum wire drawing process.

A further object is to provide an efficient and effective method of taking contaminated oil from a process wherein it has been used to lubricate and cool, removing air and water contaminants by evaporation at less than atmospheric pressure as the oil flows in a thin layer over an elongated path within an essentially airtight container, and returning the oil to the process to again effect lubrication and cooling.

Another object is to provide a method and system for separating water droplets from oil by evaporating the water, passing the vapors through a coalescing element to remove a portion of the oil vapors, and further separating the oil and water in the resulting condensate by automatic gravity flow.

The above and other novel features of the invention will appear more fully hereinafter from the following detailed description when taken in conjunction with the accompanying drawings. It is expressly understood that the drawings are employed for purposes of illustration only and are not designed as a definition of the limits of the invention, reference being had for this purpose to the appended claims.

Figure 2:
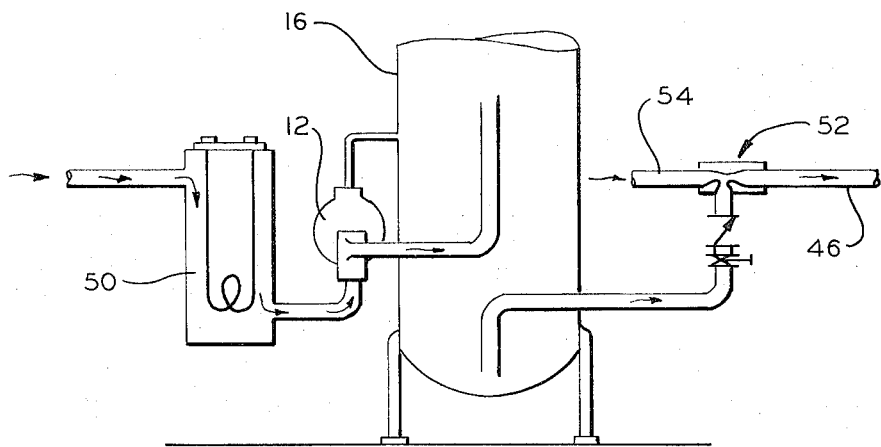

In the drawings, wherein like reference characters indicate like parts:

FIG. 1 is a somewhat diagrammatic, elevational view in vertical section of a preferred embodiment of apparatus embodying the invention; and FIG. 2 is a similar view showing alternate embodiments of portions of the apparatus of FIG. 1.

Referring now to the drawings, in FIG. 1 is shown a reservoir, indicated diagrammatically by block 10, which collects a lubricating oil after use thereof in conventional manner in a process such as the rolling or drawing of aluminum wire. As the oil is used in the process, air bubbles or water droplets may become entrapped therein and must be removed in order to render the oil effective for re-use in the process. Accordingly, oil which is or may be contaminated is taken from reservoir 10 through liquid level control valve 12 to vertical inlet tube 14 for decontamination within vessel 16. The oil is ejected from upwardly facing discharge opening 18 of inlet tube 14 at an elevated position on the interior of vessel 16 which is maintained at less than atmospheric pressure (for example, less than 27" mercury vacuum). The oil flows by gravity from discharge opening 18 in a relatively thin layer over an elongated path established by a succession of downwardly sloping, annular trays or baffles 20. The trays alternately extend outwardly from inlet tube 14 with a space for the passage of oil between the outer edge of the tray and the inside of vessel 16, and inwardly from the inside of vessel 16 with a space between the inner edge of the tray and inlet tube 14. Thus, by the time the oil has reached the lower interior of vessel 16 it has been exposed in a thin layer with a large surface area to the reduced pressure within the vessel.

In many common applications the temperature of the incoming oil is about 120° F, and the evaporation temperature for any water contained in the oil will be lowered to within this range by the reduced pressure within vessel 16. The latent heat of evaporation may be supplied through the oil, in applications where the incoming temperature is high enough, or by adding heat through the sides of the vessel in the area of the trays, as by heating jacket 22. Conventional means (not shown) would be provided for controlling any heat added in accordance with the temperature of the incoming oil so that sufficient heat is always present to insure evaporation, but a predetermined maximum heat (e.g. 160° F.) is never exceeded to avoid destroying any oil additives.

In addition to removing water droplets by evaporation, air bubbles in the oil will expand in volume, rise to the top, and break as the oil flows over trays 20. Vacuum pump 24 is arranged to remove the air and water vapor released from the oil through opening 26 in the top of vessel 16. The reduced pressure within vessel 16 is provided through the action of pump 24. The vacuum pump discharges into a cooling system, indicated diagrammatically at 28, which is at atmospheric pressure, thereby allowing the vapors removed by pump 24 to condense.

In some oils the lower fractions of additives may have relatively low boiling points, whereby some oil vapors may generate along with the water vapor. To avoid removal of at least some of these oil vapors from the gases removed from vessel 16 by pump 24, a filter or coalescing element 30 may be placed in an upper portion of the vessel, in the path of vapors being drawn upwardly toward discharge opening 26. Element 30 will tend to coalesce the oil vapors, while allowing passage of the water vapors, thereby minimizing the oil removed from vessel 16 in gaseous form.

Any oil vapors which escape the coalescing element will be evacuated from vessel 16 along with the water vapor and condensed by cooling system 28. The condensate is discharged into retention chamber 32, communicating through opening 34 with atmospheric pressure, where the oil and water will separate, being of different specific gravities.

A simple, yet automatic, separation of the oil and water is accomplished by providing a discharge level for the water which is adjustable relative to the oil discharge level. Water discharge tube 36 is connected through flexible tubing 38 to an opening in the lower part of chamber 32, and is open to atmospheric pressure through opening 40. The final discharge level of the water may thus be adjusted at a desired level a distance $L_1$ above a reference level (the bottom of chamber 32). The water discharge level is set slightly below the discharge level for the oil, which may flow out of chamber 32 through opening 42. The difference in water and oil discharge levels is represented by distance $L_4$. The distance from the bottom of chamber 32 to the water-oil interface is indicated as $L_2$, and the distance from the interface to the oil discharge level as $L_3$. Once the liquid level within chamber 32 has risen to that designated as the oil discharge level ($L_2$ and $L_3$), the water discharge level ($L_1$) may be set to maintain an automatic gravity separation of the oil and water. This is done by adjusting $L_1$ in accordance with the following formula:

$$L_1 \times (SGW) = L_2 (SGW) + L_3 (SGO)$$

where SGW is the specific gravity of water and SGO is the specific gravity of the oil. Since the specific gravity of the oil will be less than the specific gravity of water, then assuming that some oil is present in chamber 32, $L_2 + L_3$ is more than $L_1$ (in this case, by distance $L_4$). Thus, if $L_1$ is varied in accordance with variations in the oil-water interface, which may be easily measured by conventional means (not shown), only water will be discharged through opening 41 and only oil through opening 42 (as long as some oil is present in chamber 32). The oil taken from reservoir 10 and introduced into vessel 16 by pump 12 is controlled to maintain a constant, desired level within vessel 16. Means such as a level controlled valve, mechanical or otherwise, may be used to admit only the amount of oil required to replace that which is removed. Pump 44 removes oil from the bottom of vessel 16 after removal of the air and water and delivers it back through tube 46 for re-use in the process. Bypass line 48 is also shown, allowing oil to be recycled back through the evaporation vessel, if necessary or desirable, to produce an even purer oil. Appropriate valves are provided in conventional fashion on the discharge and bypass lines.

In FIG. 2 is shown an alternate means of adding heat to the oil to insure a sufficient temperature for evaporation of the water. Rather than a heating jacket around vessel 16, preheating chamber 50 is provided in the line between reservoir 10 and pump 12. An alternate means is also shown for removing the purified oil from vessel 16. Venturi eductor, indicated diagrammatically by reference numeral 52, uses high pressure oil supply pump discharge or an auxiliary pump as the prime mover. Oil from vessel 16 is returned through tube 46, as before, for re-use in the process.

Thus, simple and effective a system and method for removing water droplets and air bubbles from oil such as might be used in an aluminum wire drawing process has been disclosed. The invention uses a vacuum, or substantially reduced pressure, to lower the evaporation temperature of the water and increase the rate of foam breakup. Trays or baffles are used to establish a long flow in a thin layer for the oil, thereby assisting in the water and air removal. An automatic gravity separation method is provided for separating water and any light oil fractions which may have been evaporated and condensed with the water vapor.

While several embodiments of the invention have been illustrated and described, it is to be understood that the invention is not limited thereto. As various changes in the construction and arrangement may be made without departing from the spirit of the invention, as will be apparent to those skilled in the art, reference will be had to the appended claims for a definition of the limits of the invention.

What is claimed is:

1. A method of removing air and/or water from a lubricating oil comprising the steps of:
   a. causing the contaminated oil to flow through piping to a discharge opening within a container at less than atmospheric pressure, but substantially above absolute vacuum;
   b. allowing said oil to flow by gravity from said discharge opening in a relatively thin, substantially continuous, liquid layer over an elongated path to the lower interior part of said container;
   c. passing the vapors which escape from said liquid layer through a coalescing element extending across the entire interior of said container above said discharge opening;
   d. removing said vapors, after passage thereof through said coalescing element, from said container through an opening in an upper portion thereof;
   e. returning to atmospheric pressure and cooling said vapors, after removal from said container, to an extent sufficient to condense any liquid from said vapors;
   f. separating the water and oil in said condensed liquid; and
   g. removing the decontaminated oil from the lower portion of the container.

2. The invention according to claim 1 and including the further step of collecting the condensate in a second container and removing oil therefrom by gravity flow through a first opening at a predetermined height in a wall of the second container.

3. The invention according to claim 2 and including the further step of removing water from the second container by gravity flow through a second opening below said first opening and above the oil-water interface within the second container, said second opening being connected to the interior of said second container through piping at a point substantially below said second opening.

4. The invention according to claim 1 wherein the temperature of the contaminated oil is sufficient, at the pressure within said container, to provide the latent heat of evaporation for water initially contained within the contaminated oil.

5. A system for removing air and/or water from the lubricating oil in an aluminum wire drawing process, said system comprising in combination:
   a. a reservoir for collecting oil after use in the process;
   b. a closed vessel having an interior at less than atmospheric pressure but substantially above absolute vacuum;
   c. means for moving said oil from said reservoir through a discharge opening within said vessel;
   d. means establishing an elongated path for flow of said oil in a relatively thin layer from said discharge opening to the lower part of said vessel;

e. means for removing, through an opening in an upper part of said vessel, the air and water vapor which escape from the oil as it flows in said thin layer;

f. means for cooling, and thereby condensing, the vapors removed from said vessel;

g. a container at atmospheric pressure for collecting the condensate; and h. means for removing the decontaminated oil from said lower part of said vessel and returning it for reuse in the process.

6. The invention according to claim 5 and further including a first opening in said container for gravity discharge of liquid reaching the level of said first opening, and a second opening communicating with the interior of said second container at a lower portion thereof, significantly below said first opening, and means for vertically adjusting the position of said second opening.

7. The invention according to claim 6 wherein said means for vertically adjusting comprises a flexible tube connecting said container and said second opening.

8. The invention according to claim 5 and further including a coalescing element extending across the entire interior of said vessel between said discharge opening and said opening in an upper part, whereby all vapors must pass through said coalescing element before being removed from said vessel.

* * * * *